United States Patent [19]

King

[11] Patent Number: 4,578,935
[45] Date of Patent: Apr. 1, 1986

[54] TOBACCO HARVESTER AND METHOD

[76] Inventor: Gerald T. King, Paris Rte. 4, North Middletown, Ky. 40361

[21] Appl. No.: 510,642

[22] Filed: Jul. 5, 1983

[51] Int. Cl.⁴ .............................................. A01D 45/16
[52] U.S. Cl. ........................................ 56/27.5; 414/26
[58] Field of Search ....................... 56/27.5, 228, 16.6; 414/26

[56] References Cited

U.S. PATENT DOCUMENTS

| | | | |
|---|---|---|---|
| 2,491,232 | 12/1949 | Turnbull | 56/228 |
| 3,197,042 | 7/1965 | Harrington | 414/26 |
| 3,855,762 | 12/1974 | Middleton | 56/27.5 |
| 3,946,542 | 3/1976 | Long | 56/27.5 |
| 4,059,941 | 11/1977 | Taylor | 56/27.5 |
| 4,301,645 | 11/1981 | Spratt et al. | 56/27.5 |

FOREIGN PATENT DOCUMENTS

| | | | |
|---|---|---|---|
| 22427 | 1/1981 | European Pat. Off. | 56/27.5 |
| 2260276 | 9/1975 | France | 56/27.5 |

Primary Examiner—Robert P. Swiatek
Assistant Examiner—David L. Tarnoff
Attorney, Agent, or Firm—Trexler, Bushnell & Wolters, Ltd.

[57] ABSTRACT

An apparatus and a method for harvesting tobacco are disclosed. Tobacco stalks are cut on the afternoon of one day and are left to lie transversely of the tobacco field. The next day, a harvesting apparatus is moved through the field and includes an elevating conveyor on which the felled tobacco plants are loaded as by a person sitting in a low seat immediately forwardly of the conveyor. The conveyor and the seat comprise a part of a trailer pulled behind the tractor, and the trailer further includes behind the conveyor a platform on which workers may stand to remove tobacco plants from the conveyor and to impale them on conventional tobacco sticks. The tobacco plants, having been lying overnight in the field, are well wilted and of much reduced weight. A wagon is towed by the trailer in close proximity thereto, and when the sticks are loaded with tobacco they are tipped toward the wagon to a position where they may be picked up by a work person on the wagon for stacking of the sticks of tobacco on the wagon.

4 Claims, 12 Drawing Figures

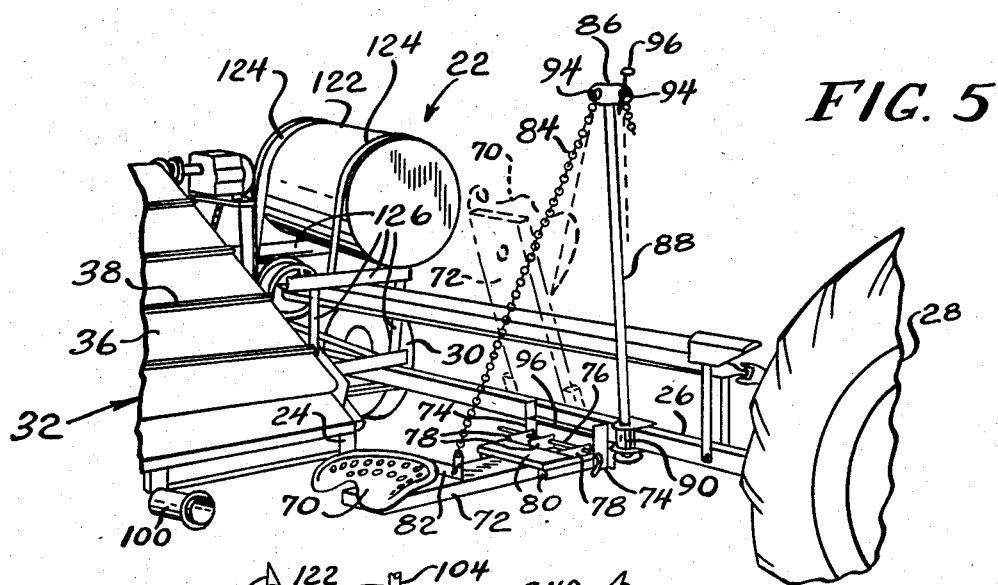
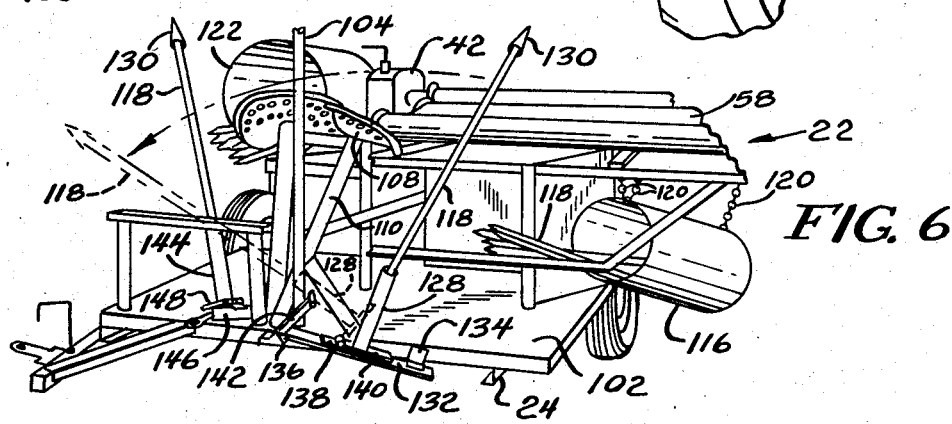
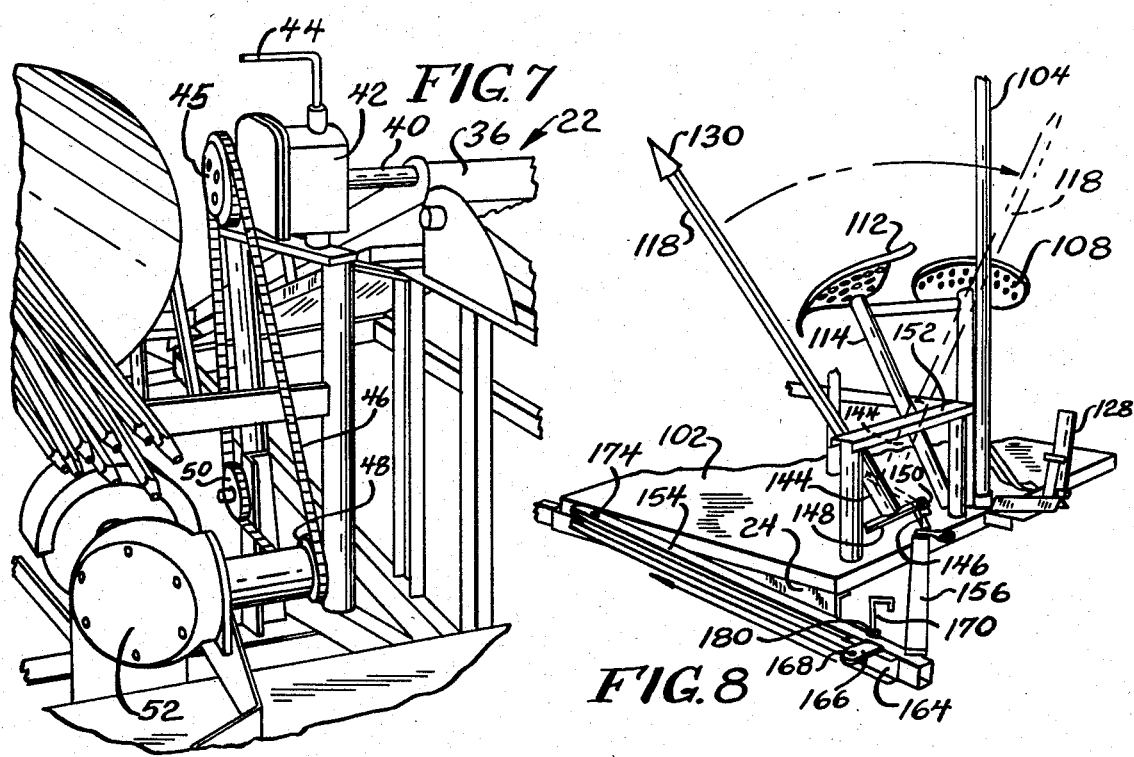

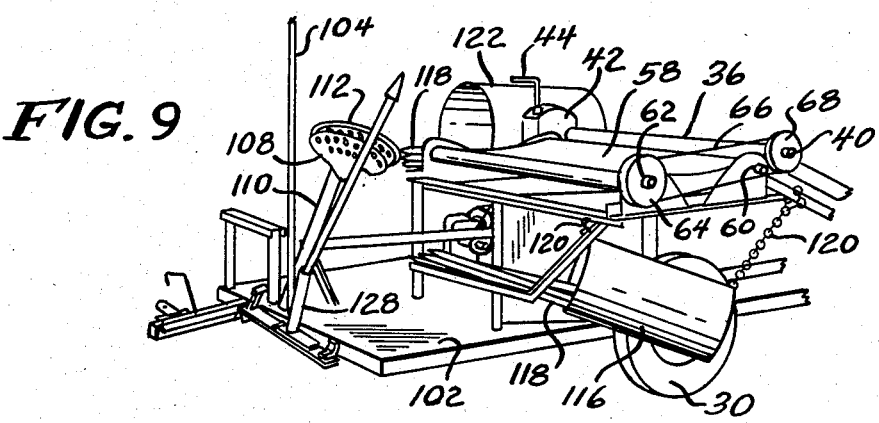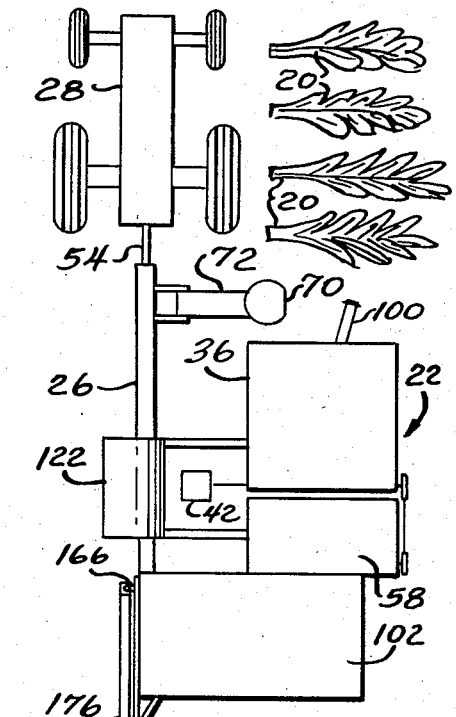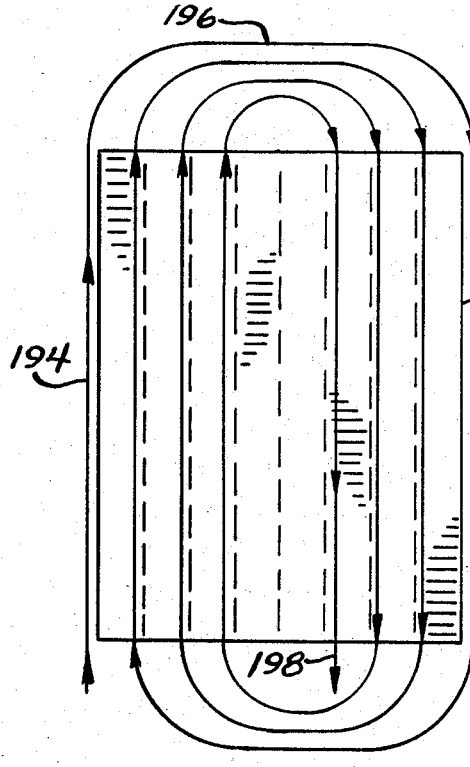

TOBACCO HARVESTER AND METHOD

BACKGROUND OF THE INVENTION

Tobacco is grown in fields, and each tobacco plant comprises a single stalk with a plurality of short branches and leaves thereon. A mature tobacco plant typically weighs from 12 to 20 or as much as 25 pounds or more.

In the harvesting of tobacco as practiced in the past a spear, more commonly known as a stick, is provided for collecting the tobacco. Each stick is on the order of 4 feet long, and is sharpened on both ends. One end of the stick is inserted into the ground with the stick in an upright position. A hollow metal tip in the form of a cone with a narrow angle is placed over the upper end of the stick. A man then cuts a tobacco plant and impales it on the stick. Six tobacco plants or stalks are sequentially impaled on a stick, and this occasionally may rise to seven stalks if they are small.

In accordance with the prior art practice the tobacco stalks are normally cut near the base by a small hand tool resembling a hatchet, and are sequentially impaled on a stick. This requires the handling of a considerable weight of tobacco. The sticks are left in an upright position in the field for something on the order of two to four days in upright position to allow the tobacco to wilt. Most of the tobacco sunburns, but the burn is removed by dew overnight. Much of the tobacco is shaded from the sun by other portions of the tobacco so there is an uneven wilt of the tobacco. Approximately 50% of the weight of the tobacco is lost as sap and other moisture leaves the tobacco in the sun. This results in a stick of tobacco weighing as much as 80 pounds or more, and this must be hand loaded onto a wagon. A certain amount of skill and a considerable amount of physical strength is necessary to cut the tobacco and to impale the stalks on the sticks.

If it should rain during the two to four day period that the tobacco is left to wilt on the sticks, a great deal of mud will be splashed onto the tobacco, thereby materially lessening the value thereof.

A typical harvesting crew is comprised of eight persons. Two are required to cut the tobacco by hand and to impale it on the sticks. Three workers distribute the sticks through the harvesting area. Subsequently the wilted tobacco is picked up one worker is required on the ground, one on the wagon for loading, and the driver.

Thus, it will be seen that a great deal of hand labor has been required in the prior art harvesting of tobacco. At least the two workers cutting the tobacco and impaling it on the sticks must be possessed of a certain amount of skill and of a considerable amount of physical strength. The driver also requires a certain amount of skill.

OBJECTS AND SUMMARY OF THE PRESENT INVENTION

It is an object of the present invention to provide an apparatus and method for harvesting tobacco which reduces the number of workers required in the field, and which materially reduces the requisite level of skills and strength of such workers.

A further object of the present invention comprises the method of harvesting tobacco which includes the step of allowing the tobacco to lie on the ground overnight before picking it up and impaling it on a stick.

A further object of the present invention is to provide an apparatus for harvesting tobacco wherein the apparatus raises the tobacco from essentially ground level to waist level for two workers riding on the apparatus to impale the tobacco stalks on sticks and position the same for removal and stacking on a wagon by a worker riding on the wagon with the wagon attached to the harvesting apparatus.

In attaining the foregoing and other objects of the present invention a single worker on foot manually cuts the tobacco stalks from their bases. This worker need not be especially strong since it is not necessary from him to pick up the tobacco stalks and impale them on a stick. He need not be especially skilled since all he needs to do is swing a cutter to sever the stalk. The tobacco is allowed to lie on the ground from mid to late afternoon until mid morning of the following day. During this period the tobacco loses about ¾ of its weight by evaporation of sap without sunburning due to the rather short exposure time. Each tobacco stalk or plant thus weighs but three to ten pounds. An apparatus constructed in accordance with the present invention is towed behind a tractor and is provided with an elevating conveyor, and with a seat low to the ground and adjacent to the lower end of the conveyor. A worker sits in this low seat and picks up tobacco stalks from the ground and places them on the conveyor. The conveyor raises the stalks to about waist level where two workers, operating alternately, impale the plants on respective sticks. The sticks are carried by hinged sockets so that when six stalks have been impaled the worker can remove the metal tip and tip the stick to a position where it is readily picked up by a loader, comprising a person riding on a wagon towed in close proximity to the harvesting apparatus. In accordance with the present invention when the tobacco is first picked up it weighs only about ¼ of what the green tobacco as cut weighs. Therefore, great physical strength is not required to establish the sticks of tobacco, and great physical strength is not required to transfer the sticks, weighing on the order of 35 to 40 pounds, from the harvesting apparatus to the wagon.

THE DRAWINGS

The present invention will best be understood with reference to the following description of the illustrated embodiment when taken in connection with the accompanying drawings wherein:

FIG. 5 is a right front perspective view on an enlarged scale of a portion of the apparatus of FIG. 3;

FIG. 6 is a right rear perspective view of the apparatus;

FIG. 7 is a left rear perspective view on an enlarged scale showing a portion of the present invention;

FIG. 8 is a framentary left rear perspective view of the apparatus;

FIG. 9 is a right rear perspective view of the apparatus;

FIG. 10 is a fragmentary left rear perspective view of the apparatus;

FIG. 11 is a plan view, somewhat schematic in nature, illustrating the the movement of the tractor and the towed apparatus and wagon through a field of cut tobacco; and FIG. 12 is a schematic top view illustrating the pattern of movement of the apparatus through a tobacco field in accordance with the present invention.

DETAILED DISCLOSURE OF THE ILLUSTRATED EMBODIMENT

Figure 1:
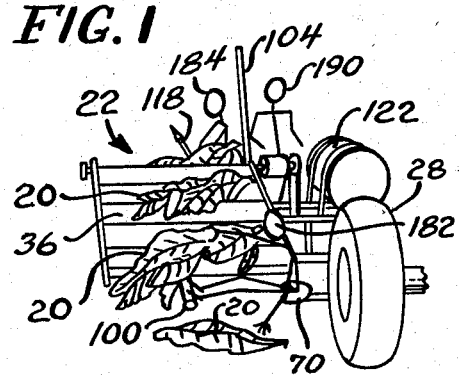
FIG. 1 is a somewhat simplified perspective view of an apparatus constructed in accordance with the principles of the present invention and operating in accordance with the method of the present invention.
Figure 2:
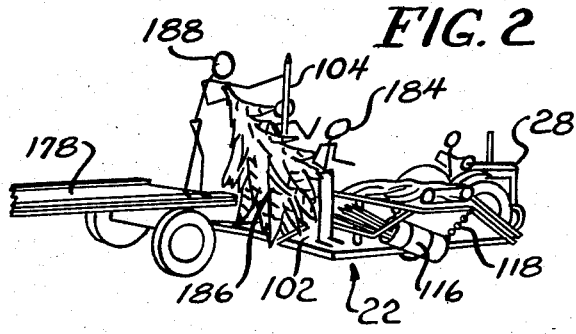
FIG. 2 is a right rear perspective view showing transfer of a stick of tobacco from the harvesting apparatus to the wagon.
Figure 3:
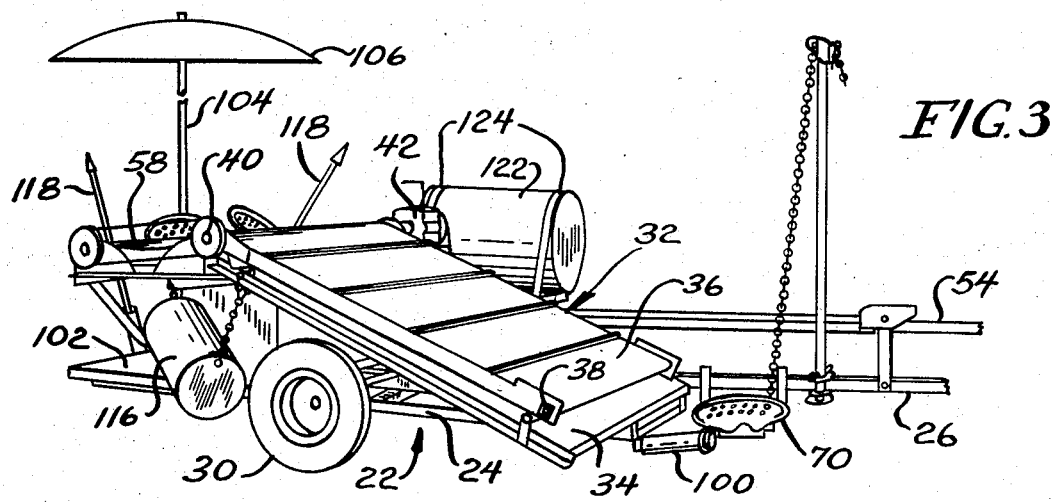
FIG. 3 is a right front perspective view of the apparatus constructed in accordance with the present invention and on a somewhat enlarged scale.

Tobacco is conventionally planted in fields in parallel rows. In the vicinity of Lexington, Ky. a tobacco crop takes about 110–115 days growing time. A tobacco plant or stalk grows to four to six feet in height and weighs from 12 to 20, or sometimes as much as 25 pounds. In accordance with the present invention a man walks through the field and manually cuts the tobacco plants with a small hand tool resembling a hatchet. One blow on each stalk adjacent the base thereof is sufficient, and a slight push with the other hand causes the tobacco plants to fall in a generally parallel pattern transverse of the rows as indicated at 20 in FIGS. 1 and 11. Cutting is started at about 2:00 in the afternoon, and may continue for perhaps two hours. More than one worker may be necessary to cut the entire field in this time. The severed tobacco plants are left lying on the ground overnight. Exposure to the afternoon sun, and to sun on the following morning causes each plant to lose approximately 75% of its weight without the plant becoming sunburned. In the event of rain, there is very little or no mud damage, since the plants mostly cover the ground and prevent rain from causing mud to splash upward onto the tobacco plants. The following morning, starting at perhaps 9:00 the tobacco is picked up by means of the apparatus now to be described.

The harvesting apparatus comprises a trailer 22 having a suitable frame 24 of welded steel. The frame includes a beam or tongue 26 extending forwardly for attachment to the hitch (not shown) of a conventional farm tractor 28. The tongue or beam 26 is toward the left side of the trailer 22 so that the trailer is offset to the right from the tractor 28, as is best seen in FIG. 11. This allows the trailer to be driven to the left of a row of felled tobacco with the trailer approaching such felled tobacco.

The trailer frame 24 suitably supports a pair of wheels 30 for movement of the trailer behind the tractor. The trailer further includes an elevating conveyor 32 including an angled plate 34 and a wide conveyor belt 36 having transverse metal cleats 38 thereon. The belt 36 is provided at its lower end with an idler shaft 38 and at its upper end with a driven shaft 40, both carried in suitable bearings.

The driven shaft 40 as seen in FIG. 7 is driven through a clutch mechanism 42 having an operating handle 44 thereon connecting the shaft to a cog wheel 5 driven by a chain 46 passing over a driven cog 48 and an idler cog 50. The driven cog is mounted on a shaft driven from a right angle gear mechansim 52 driven by a drive shaft 54 extending forwardly of the trailer above the beam or tongue 26, having a universal joint 56 therein, and connected to the tractor power take-off (not shown), commonly referred to as a PTO. The upper portion of the conveyor belt 36 overlies and feeds onto a short horizontal conveyor belt 58 (FIG. 9) having a front idler shaft 60 substantially underlying the shaft 40, and a rear driven shaft 62. The driven shaft 62 is provided with a pulley 64, and a drive belt 66 drives the pulley 62 from a pulley 68 on the driven shaft 40 of the inclined conveyor belt.

A loader seat 70 is provided forwardly of the elevating conveyor 32 and at a slightly lower elevation than the front edge of this conveyor. The seat is arranged transversely and is of the shaped metal type commonly used for tractors and other farm implements. It is mounted at the end of a plank 72 extending transversely from the tongue or beam 26 to which it is pivotally secured. Such securement includes angle irons 74 welded to the tongue and having a rod 76 extending therethrough. Angle irons 78 are secured to the plank 72 and have holes receiving the rod 76 for pivotal mounting of the seat 70. The plank 72 at the pivotal end is provided with reinforcements 80, and adjacent the seat there is an angle iron 82 transversely secured to the plank.

This angle iron has an aperture to which is secured a chain 84. The chain extends dia9onally upwardly to a fitting 86 on the upper end of an upright mast 88 secured at its lower end at 90 by suitable fittings and weldings to the tongue 26. The fitting 86 is provided with two apertures 94 through which the chain 84 extends, a headed pin or the like 96 extending through the free end of the chain to limit its position through the fitting. This provides for support of the plank 72 in substantially horizontal position. The seat 70 and plank 72 are pivotable up to nearly vertical travelling position as shown in broken lines in FIG. 5. An angle iron 96 welded along the tongue 26 serves as an abutment to limit upward pivoting of the plank to the position shown.

A foot rest 100 is spaced from the seat 70 and is secured, as by welding, to the front of the frame 24 at the underlying front end of the elevating conveyor 2. Thus, a loader may sit on the seat 70 with his or her feet on the footrest 100 to pick up tobacco plants lying on the ground and to place them on the conveyor belt 36. This will be set forth in somewhat greater detail hereinafter. It is within the contemplation of the present invention that the seat 70 and attendent structure should be eliminated and mechanical pick up means could be provided, somewhat similar to that of a corn shucker with fingers on a shaft across the front of the elevating conveyor.

To the rear of the horizontal conveyor belt 58 there is a platform at a rather low level of the trailer suitably carried by the framework 24. The platform is adapted for working persons to stand on it with the horizontal conveyor 58 at about waist level. At the rear edge of this platform and generally centrally thereof there is provided an upright pole 104 adapted to be grabbed by a workman for balance, and adapted to carry at its upper end an umbrella 106 for protection from the direct rays of the sun. Immediately to the right of the pole 104 there is provided a workman's seat 108 supported on a post 110 extending up from the platform 102. The seat is tipped forward and is at an elevation just a bit too high for a person of medium build to sit on with his feet on the platform. It is intended that a workman should be in a more or less standing position, and lean against the seat to support some weight, and for balance. A left worker's seat 112 is similarly supported to the left of the pole 104 on a post 114. This seat is also a bit too high and is tipped or tilted, as with the seat 108, to serve more as a brace than an actual seat. Both seats 108 and 112 are similar to the seat 70, being of the shaped, perforated metal variety.

A right container 116 for wooden sticks or spears 118, comprises a cylindrical container closed at the bottom and open at the top. This container is supported in an angled position with the open end higher than the closed end beneath the horizontal conveyor 58 by means of chains 120 secured to the ends of the container and suitably secured to the frame of the machine. As will be apparent, the opening end of the container is disposed toward the rear so that the sticks 118 overlie the platform 102.

A left stick supply container 122 is supplied to the left side of the conveyors 32 and 58. Like the container 116, it is cylindrical in nature, being closed at the front end and open at the rear end. It is somewhat higher at the rear end than at the front end, and is secured by metal straps or bands 124 on an upstanding frame 126 secured to the main frame 124. A supply of sticks 118 extends from the container 122.

A right stick receiving socket 128, (FIGS. 6, 8 and is provided at the rear edge of the platform 102 slightly closer to the pole 104 than to the right edge of the platform. The socket angles diagonally to the right and slightly forwardly. It receives the lower end of one of the sticks 118 which is transferred manually thereto from the supply container 116. The stick has a sharp metal point 130 placed on the upper end which forms a friction fit with the sharpened wood end of the stick and comprises a hollow, sharp metal cone. It penetrates and splits the stem of a tobacco plant which is manually impaled on the stick 118.

In order to support the socket 128 there is provided an inclined metal plate 132 adjacent the rear edge of the platform 102, supported by suitable brackets 134 and 136 welded to the platform. The left side of the hinge mechanism 138 is welded to the plate 132, while the other half or leaf 140 rests on the plate 132. The socket 128 is welded to the hinge leaf 140 in a position perpendicular thereto. The socket 128 is pivotable from the solid line position of FIG. 6 in which it receives the tobacco stems or stalks to the broken line position of FIG. 6 where it abuts a diagonal brace 142 upstanding from the platform 102 where the stick is in position for loading onto a wagon as will be disclosed shortly hereinafter. Similarly, a left side socket 144 (FIGS. 4, 6 and 8) is secured at a diagonal angle near the left rear edge of the platform 102, slightly closer to the post 104 than to the left edge of the platform. As will be apparent, this socket receives a stake 118 with a sharpened spear or point 130 thereon, manually transferred from the supply container 122. A bracket 146 is welded to the platform 102, and a lever 148 is pivotally connected thereto at 150 with the socket 144 welded to the lever 148 perpendicular thereto. A framework including a horizontal bar 152 is provided at the left rear portion of the platform 102. The left socket 144 is pivotable from the solid line position of FIG. 8 where it receives the tobacco stalks to the broken line position abutting the member 152 for transfer to a wagon.

Figure 4:
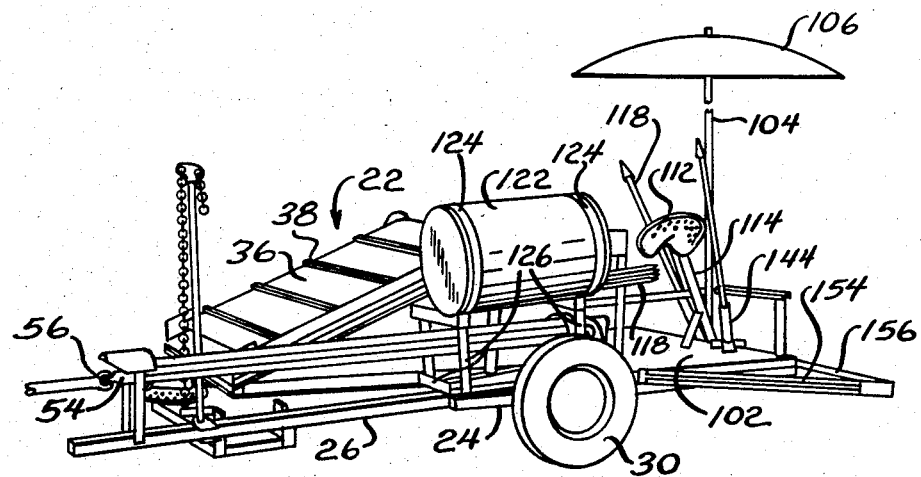
FIG. 4 is a left front perspective view of the apparatus.

Structure for attachment of a wagon to the trailer 22 is shown in FIGS. 4, 8 and 10, and includes an elongated channel member 154 welded to the side of the platform 102 and the underlying frame 24. The rear end of the channel 154 is several inches lower than the front end, and the rear end extends some distance behind the platform 102. The rear end is braced by a member 156 welded to the rear end of the platform 102 and to the rear end of a channel member 154.

Then channel shape member 154 is generally rectangular in cross section, and has inwardly directed flanges 158 defining between them a slot 160, which is closed at the lower rear end as indicated at 162. A channel shaped bracket 164 is mounted for sliding movement along the outer faces of the flanges 158 of the channel shape member 154 and is welded or otherwise suitably secured to a body (not shown) within the channel shape member. A lateral bar 166 is welded to the top flange of the bracket 164 and is provided with an aperture 168 therein. Pairs of aligned holes 170 and 172 are provided in the channel shape member 154 respectively adjacent the front and rear ends thereof, and the shank 174 of a handle is selectively inserted through these holes and through a hole in the body secured to the back of the channel shape bracket 164 to secure the bracket at either the front of the channel shape member 154 as shown in FIG. 10, or adjacent the rear thereof as shown in FIG. 8.

The purpose for this multi-purpose positioning of the bracket 164 and of the bar 166 is to provide selective positioning of a wagon towed behind the trailer 22. Thus, for initial securement of the wagon tongue 176 (FIG. 11) to the trailer the bracket 164 is positioned adjacent the rear end of the channel shaped member 154 as shown in FIG. 8. This position is used for towing the assemblage when it is necessary to make curves or turns, and towing in this position may be used to move the trailer and wagon 178 to a position to start harvesting of tobacco. The handle shank 170 then is lifted up from its lowermost position, the tractor and trailer are backed up relatively to move the bracket 164 to the forward position of FIG. 10, and the handle is re-inserted. An enlargement 180 on the handle prevents the handle from passing too far through the channel shaped member 154. In this position the front end of the wagon is close to the rear edge of the platform 102 of the trailer 22.

As noted heretofore, a workman passes through a tobacco field starting conveniently at about 2:00 P.M. He cuts each tobacco plant down, deflecting it to a position transverse of the field as shown generally in FIGS. 1 and 11. The position shown in FIG. 11 is somewhat schematic, and the tobacco plants 20 may not lie exactly parallel, and will in all probability somewhat overlap one another. The next morning, after the tobacco has wilted and has lost about ¾ of its weight due to loss of sap, the tractor-trailer-wagon assemblage is driven over the field in the position shown in FIG. 11. A person represented by the stick figure 182 in FIG. 1 sits on the seat 70 with his feet on the foot support 100 and picks up the tobacco plants 20 lying on the ground and places them on the inclined conveyor belt 36 substantially transversely thereof, also as shown in FIG. 1. In connection with this loading it will be understood that the seat 70 is only a few inches above the ground so that it is not a terribly difficult task for the person 182 to move the tobacco plants from the ground to the conveyor belt 36. It is also to be borne in mind that each tobacco plant by this time weighs only on the order of three to six pounds whereby it is far easier to handle than the fresh green plant at 12 to 20 pounds, or as much as 25 pounds, as must be handled by the person who cuts and impales the plants on the stick in accordance with the prior art.

Six successive tobacco plants 20 fed by the inclined conveyor belt 36 and the horizontal conveyor belt 58 are successively removed manually by another worker, represented by the stick figure 184 on the right rear portion of the platform. The person takes the tobacco plants one by one and spears them over the stick 118 which at this time is in the solid line position of FIGS. 6 and 9. The workman 184 then tips the stick to the rear dotted line position in FIG. 6, where the assembly of stick and tobacco plants 186 is removed by a person represented by the stick figure 188 on the wagon 178. This person then stacks the stick of tobacco 186 transversely on the wagon, starting from the back of the wagon in multiple layers, and working toward the front of the wagon.

The worker on the left rear portion of the wagon, represented by the stick figure 190 then takes the next six tobacco plants 20 from the conveyor belts 36, 58 and impales them on the stick on the left side of the platform with the stick in the solid line position shown in FIG. 8. It is to be noted that the stalks of the wilted tobacco plants are much more readily impaled over the spear point 130 and stick 118 than is the case with fresh cut stalks in the prior art. When the workman 190 has placed six stalks of tobacco on the adjacent stick he pivots the stick from the solid line position to the broken line position of FIG. 8 where the stick of tobacco is readily available to the workman 188 on the wagon for further stacking of sticks of tobacco on the wagon.

It will be observed that no one person has to lift a heavy weight any great vertical distance. The workperson sitting on the seat 70 has to lift only a light three to six pound load from ground level up a foot or two onto the inclined conveyor belt. The next workperson, either at 184 or 190 moves the tobacco plants essentially horizontally on a one by one basis, and then only has to pivot the stick of tobacco plants to the rear as indicated at 186. This also does not require much physical work.

The workperson 188 on the wagon must lift the entire stick of tobacco 186, but only through a vertical lift of about two feet or so, and the stick weighs a maximum of 35 to 40 pounds, and may run as little as 18 to 20 pounds, as contrasted with the prior art practice in which a stick of tobacco could be expected to weigh as much as 80 pounds or more.

No skilled labor is needed, fewer people are needed in the field than heretofore, and no one person is required to lift an especially heavy load. Thus, workers on the trailer and on the wagon can be young people or women with skilled and robust workers reserved for lifting and placing the tobacco sticks in a curing barn for drying and curing of the tobacco.

It will be noted that the clutch handle 44 is in position for easy access by the left side worker 190, and can be reached with a stretch by the right side worker 184. Thus, should anything jam, or should anyone of the workers encounter any difficulties, the conveyors can be stopped promptly.

Progress of the tractor through a tobacco field 192 is seen schematically in FIG. 12. The tractor initially drives along immediately to the left of the field with felled tobacco lying in it, the path being indicated at 194. The trailer 22 passes over the field, and particularly in line with the first row of chopped tobacco plants. When the assemblage reaches the end of the field, the wagon tongue 176 is moved to the rear end of the channel shaped member 154 so that the assemblage can turn, somewhat along the end line 196. The tractor then is brought up along the far edge of the field 192, and the tractor and trailer are backed up to allow movement of the bracket 164 from the rear end of the channel shaped member 154 to the position at the front of the channel shaped member. Progress is then made along the far edge of the field as indicated at 196. As before, the tractor lies outside of the area of chopped or felled tobacco with the trailer moving immediately over the area of felled tobacco. Increasingly narrow turns are made and successive passes are made along the cleared margins of the field as indicated by the continuation of the line 196, the wagon being dropped back each time it is necessary to make the curves at the end, and the assemblage eventually exiting the field as shown by the arrow 198. The assemblage of tractor, trailer and wagon eventually reaches the tobacco barn where it is driven either forwardly or in reverse into the barn where skilled workers will pick the tobacco sticks from the wagon and hoist them up to an elevated level where the sticks are supported horizontally in known fashion with the tobacco plants hanging gravitationally downwardly therefrom for drying and curing. The rate of movement of the tractor, trailer and wagon through the field is somewhat variable depending on the particular workers involved and the condition of the field. However, the rate is generally faster than a slow walk.

If the worker who cuts the tobacco plants is reasonably careful there is very little overlapping of tobacco leaves. This is in distinct contrast to the prior art practices in which the green tobacco is placed on sticks and much of the tobacco is shaded by the remainder of the tobacco. Thus, in accordance with the present invention there is an even wilt of the tobacco as contrasted with the uneven wilt in the prior art. Due to this lack of shading and to lying flat on the hot ground the wilt is much more effective and the weight is reduced by substantially ¾ overnight, as contrasted with only about a 50% loss of weight over a period of a few days in accordance with the prior art. Furthermore, the leaves of fresh tobacco tend to break, and this requires some skill on the part of the cutter using prior art techniques, since he must cut the green tobacco and impale it on the stick as soon as it is cut. In accordance with the present invention no such skill is necessary since the leaves of the wilted tobacco do not readily break. As noted heretofore, with the tobacco lying flat on the ground, the ground is generally protected in the event of rain, so there is not so much mud splashed up onto the tobacco as there is in accordance with prior art practices with the tobacco impaled on the upright sticks in the ground. It will also be observed that more tobacco can be stacked on a wagon in accordance with the present invention since the tobacco is much better wilted than in accordance with prior art practices.

It is undesireable to leave tobacco on the wagon for too long, and it should be unloaded into a tobacco barn quite promptly. Since relatively small numbers of relatively unskilled labor can be used in accordance with the present invention for picking up of the felled tobacco and loading it on the wagon, there are more skilled workers available for unloading in the barn.

The specific example of the invention as herein shown and described is for illustrative purposes only. Various changes in structure and variations in the method will no doubt occur to those skilled in the art, and will be understood as forming a part of the present invention insofar as they fall within the spirit and scope of the appended claims.

The invention is claimed as follows:

1. Apparatus for harvesting tobacco comprising a vehicle having an elevating conveyor means thereon rising from a front receiving portion to a rear discharging portion, means on said vehicle forwardly of said conveyor means for use in loading felled tobacco plants onto said conveyor means receiving portion, a platform to the rear of and at a lower elevation than said conveyor means discharge portion for a workman to stand on to receive tobacco plants from said conveyor means discharge portion, means adjacent the rear of said platform for receiving a tobacco stick in substantially upright position so that a workman receiving tobacco plants from said conveyor means can successively impale a plurality of tobacco plants on said stick for transfer of a stick of tobacco from said vehicle, said tobacco stick receiving means being movably mounted relative to said platform for movement from a first position relatively overlying said platform for convenient manual impaling of tobacco plants on the tobacco stick carried thereby to a second position relatively rearwardly of said platform for transfer of a stick of tobacco from said vehicle.

2. Apparatus as set forth in claim 1 wherein said tobacco stick receiving means is pivotally mounted for movement from said first position to said second position.

3. Apparatus as set forth in claim 1 and further including storage means for a plurality of tobacco sticks adjacent said platform for manual transfer of said sticks one at a time to said tobacco stick receiving means.

4. Apparatus for harvesting tobacco comprising a tractor having a hitch and a power take-off thereon; a trailer, drawbar means on said trailer adjacent one side thereof and connected to said tractor hitch for towing said trailer behind and laterally offset relative to said tractor, elevating conveyor means on said trailer having a relatively low front receiving portion and a relatively high rear discharge portion, power means for driving said conveyor means and comprising means connected to the tractor power takeoff, a seat, means supporting said seat from said drawbar means and spaced laterally thereof and forwardly of said conveyor means front receiving portion for a workman to ride on to load felled plants from the ground on to said conveyor means front receiving portion, a platform on said trailer to the rear of said conveyor means and at a lower elevation than said discharge portion, said platform having two work stations each having storage means for a plurality of tobacco sticks and further having means for receiving a tobacco stick in substantially upright position transfered manually one-by-one from said storage means, each said work station being adapted to accommodate a workman for manually receiving tobacco plants from said discharge area and sequentially impaling them on a tobacco stick in said receiving means, said receiving means each being pivotable from a relatively forward position for said impaling and a relatively rearward position for transfer of tobacco sticks from said trailer, said trailer having means thereon relatively adjacent the same side as said drawbar for securing the tongue of a wagon thereto; and a wagon trailing behind said trailer for receipt of said sticks of tobacco and having a tongue secured to said trailer wagon tongue securing means, said wagon being laterally offset relative to said trailer and substantially aligned with said tractor.

* * * * *